Patented Aug. 4, 1931

1,816,817

UNITED STATES PATENT OFFICE

STANLEY BIALOS, OF SAN FRANCISCO, CALIFORNIA

THERAPEUTIC COMPOSITION

No Drawing. Application filed September 13, 1927. Serial No. 219,369.

My invention relates to a therapeutic composition, in which petroleum oils such as refined liquid petrolatum is used as a therapeutic constituent.

An object of the present invention is to provide a therapeutic composition comprising mineral oil and another substance which will flavor the taste of the petroleum.

Another object of the invention is to use with mineral oil a substance of the character described, which will also form a stable composition therewith.

Another object of the invention is to use a substance of the character described, which itself has a high therapeutic value.

Other objects of the invention, together with the foregoing, will be set forth in the following description of the preferred embodiment of means for practicing my invention. It is to be understood that I do not limit myself to the showing made by the said description, as I may adopt variations of my invention as set forth in the claims.

The therapeutic value of refined mineral oil is well recognized. Its advantage lies in the fact that when taken into the system, there is little or no absorption thereof, hence no harmful or depressed results occur from its use. However, although the substance alone is of great value, it has an oily taste which is obnoxious to some people who consequently dislike taking it. Recently, efforts have been made to produce a composition in which mineral oil such as liquid petrolatum is a chief therapeutic substance and in which a substance such as agar is used to flavor the taste of the oil. However, it has been found that a great majority of these compositions separate on standing and that the taste of the oil is only slightly improved. The present invention is designed to overcome these difficulties.

In terms of broad inclusion, my invention comprises a stable composition of petroleum oil such as liquid petrolatum or Russian oil and concentrated fruit juice. The composition remains in stable suspension or emulsion due to colloidal substances, such as pectin or pectin like substances in the fruit juice which act as dispersing agents.

In greater detail, my invention comprises an emulsion of refined mineral oil and concentrated fruit juice and/or mash containing concentrated juice. Various fruits may be used, such as strawberries, raspberries, currants, figs, apples, pears, prunes, quinces and dates. Of these, it is preferred to use prunes, pears or apples due to the particularly high content of colloidal forming substances therein.

In the preparation of the juice concentrate, two procedures may be followed, one in which the final product is a liquid emulsion and the other in which it is a colloidal jam.

To make the liquid composition, any fruit of the type described is cut up in any convenient manner, such as by running the fruit thru a chopper or grinder. In any event, it is only necessary to cut the fruit sufficiently in order that the juice may be easily extracted. The chopped fruit is placed in a retort and is digested with water until the contents have boiled down to a thick mass. The mass is then filtered by running the contents thru a filter press or thru any other filtering medium. The filtrate will contain pure juice concentrate plus water. The residue is again digested, as before, and the process is repeated until all the juice has been extracted from the fruit. All the filtrates are combined, and gently heated in an open vessel until the water used in extracting the juice has been evaporated. The concentration is then continued at a temperature of between 180° to 212° F. until the juice, when cooled, will jell. This condition can be determined by drawing some of the concentrated juice thru a pipette having an orifice of about $1/8$ inch. When approximately 6 drops fall out in ten seconds at a temperature of about 180° F., the proper consistency is obtained.

One volume of this juice, at a temperature of between 190° to 212° F. is poured into an emulsifier, and the mineral oil is gradually admitted during vigorous and continual stirring of the mixture until it has cooled to room temperature. From $1\frac{1}{2}$ to 3 volumes of oil can be emulsified with the juice, depending upon the concentration of the juice, the rate of stirring and the rate of cooling. It is thus seen that an emulsion containing 60% to 75% mineral oil and 25 to 40% concentrated juice is obtained.

In order to prevent the growth of molds, a preservative, such as approximately 0.1% sodium benzoate, calculated on the amount of juice, may be added to the concentrated juice before the oil is added. However, it is preferable to make a thick syrup of sugar and add it to the concentrated juice, so that the proportion of syrup is about 12 to 15% of the weight of concentrated juice. The composition, when sugar is added as the preservative, contains 60 to 70% of liquid petrolatum, and 30 to 40% of preserved concentrated juice by volume; the preserved juice contains 12 to 15% sugar by weight. It is especially desirable to use sugar as the preservative, since the thick mass of syrup also acts as an emulsifying agent.

In preparing the colloidal jam or semi-liquid composition, the fruit is finely ground in a grinder or colloidal mill and the juice is extracted from the mash with water as in the previously described process, but the juice concentrate is not filtered. The entire mass is gently boiled down until all the water of extraction has been evaporated and the juice is concentrated to approximately the same degree as in the former process. The mineral oil is poured into the heated mash at a temperature between 190° to 212° F. while the mass is stirred vigorously until cooled to room temperature. The final composition may also be preserved with 0.1% sodium benzoate or with 12 to 15% sugar, calculated on the weight of mash. However, in this process, due to the thick body provided by the mash containing the concentrated juice, a higher percentage of oil may be incorporated, ranging from 60 to 80%.

The best results and the greatest amount of petroleum incorporation are obtained when concentrated apple or prune juice is used. This is believed to be due to the fact that these two fruits are exceptionally high in colloidal substances such as pectin, hence a stable colloidal composition with liquid petrolatum is obtained.

It is thus seen that a stable colloidal composition is obtained in which the petroleum taste is flavored, and since the concentrated juice has a high therapeutic value, the composition is doubly effective, and no injurious ingredients are used for forming the colloidal suspension.

I claim:

1. A therapeutic composition comprising a homogeneous and stable mixture of mineral oil and concentrated prune juice.

2. A therapeutic composition comprising a homogeneous and stable mixture of mineral oil, and concentrated fruit juice.

3. A therapeutic composition comprising a homogeneous and stable mixture of mineral oil, and concentrated fruit juice contained in fruit mash.

4. A therapeutic composition comprising a homogeneous and stable mixture of mineral oil, and concentrated apple juice.

5. A therapeutic composition comprising a homogeneous and stable mixture of mineral oil, and concentrated pear juice.

In testimony whereof, I have hereunto set my hand.

STANLEY BIALOS.